3,202,481
PURIFICATION OF NITRIC ACID
Howard B. Bradley and Robert G. Pankhurst, Tonawanda, N.Y., assignors to Union Carbide Corporation, a corporation of New York
No Drawing. Filed June 4, 1962, Ser. No. 199,633
8 Claims. (Cl. 23—159)

This invention relates to a process for the removal of impurities, especially arsenic and phosphorus impurities, from nitric acid and to the so-purified product.

Chemically pure nitric acid is widely used as a reagent in analytical procedures. One illustration of such use lies in analytical procedures to determine arsenic and phosphorus content in high-purity silicon metal and in high-purity silicon-containing compounds, such as trichlorosilane, silicon tetrachloride and monosilane, employed as raw materials for such high-purity silicon metal. In the analysis of such trace impurities one generally deals with arsenic and phosphorus levels of less than about 100 p.p.b. by weight. The abbreviation "p.p.b." used herein refers to parts per billion by weight or parts per $10^9$ parts by weight. It is thus apparent that the reagents used in the analytical process should be substantially free of arsenic and phosphorus in order to prevent contaminating the sample and causing an erroneous analysis result. Prior art "chemically pure" nitric acid still contained several parts per billion by weight of arsenic and phosphorus impurities.

Another use for high purity nitric acid is in etching and cleaning solutions for metals. An illustration of this is the nitric acid-hydrofluoric acid-glacial acetic acid mixture employed to clean the surfaces of silicon semi-conductors to remove some inorganic impurities such as borates.

Nitric acid useful in analysis of arsenic and phosphorus as well as other high-purity applications can be obtained by the process of the present invention which comprises contacting the nitric acid with an oxidizing agent which oxidizes the arsenic and phosphorus impurities to high-boiling point oxidized impurity compounds and with a molybdenum compound which forms high-boiling point complex compounds with the oxidized phosphorus impurities, and then separating the high-boiling point oxidized impurity compounds and complex compounds from the nitric acid.

It is noted that while this process is specifically useful to remove arsenic and phosphorus impurities, substantial quantities of sulfur impurities are also removed. To aid in sulfur removal preferably add a barium compound, such as barium oxide, along with the oxidizing agent which will form an insoluble, high-boiling point barium sulfate precipitate which can be easily separated from the nitric acid.

The high-boiling point oxidized impurity compounds and complex compounds can be conveniently and preferably separated from the nitric acid by distillation. It should be understood that other separation methods, such as selective adsorption of the oxidized impurity compounds and the complex compounds and differential diffusion through a membrane or porous medium, can also be employed within the scope of the invention.

The oxidizing agent used in this process is preferably an alkali metal permanganate, such as potassium permanganate or sodium permanganate or an alkaline earth metal permanganate, such as calcium permanganate, magnesium permanganate, strontium permanganate or barium permanganate. Ammonium permanganate can also be employed. Other oxidizing agents which can be employed are illustrated, for example, by the persulfates, such as ammonium persulfate, sodium persulfate and potassium persulfate, and the chlorates, such as ammonium chlorate, potassium chlorate and sodium chlorate. Manganese dioxide can also be employed. Potassium permanganate is generally the preferred oxidizing agent for this process. The choice of a specific oxidizing agent or mixture of oxidizing agents will be determined by the particular impurities to be removed and the material systems in which the impurities are present. For example, removal of arsenic impurities from one material may preferably require an oxidizing agent different from that required for removing arsenic impurities from a different material or for removing phosphorus impurities from the same or different materials. Choice of oxidizing agent is thus dictated by purity considerations in terms of the end product.

The oxidizing agent reactive toward arsenic, phosphorus and sulfur impurities is contacted with the nitric acid under conditions resulting in the formation of high boiling point oxidized arsenic, phosphorus and sulfur compounds. These high-boiling point oxidized impurity compounds having boiling points higher than those of the original impurities and higher than nitric acid are then separable, preferably by distillation, from the nitric acid.

The molybdenum compound employed to form a complex with the oxidized phosphorus impurities is preferably molybdenum trioxide since it is readily available in a highly purified form. Other molybdenum compounds which can be employed are the molybdates, such as ammonium molybdate, potassium molybdate and sodium molybdate.

The process conditions for carrying out this invention are not narrowly critical. Reaction temperature above room temperature is desirable in order to obtain reasonable reaction rates. Preferably the nitric acid is contacted with the oxidizing agent and the molybdenum compound at the boiling point of nitric acid so that it can be continuously removed by distillation from the oxidized impurity compounds and complex compounds which remain in the residue. Atmospheric pressure conditions are also preferably employed. Nitric acid can thus be purified under reflux conditions of atmospheric pressure and about 120° C. The amounts of oxidizing agent, molybdenum compound and barium compound are also not critical, but it is preferred that they are present in amounts in excess of that required to completely react with the impurities to be removed.

If the primary impurity in nitric acid which is desired to be removed is arsenic, only the steps of contacting the acid with the oxidizing agent and then separating the high-boiling point oxidized impurity compound from the nitric acid need be carried out. Such purified product also has utility as an analytical reagent.

The invention will be illustrated by the following example.

*Example*

The purification equipment consists of a glass distilling flask equipped with a glass distillation column (having about 1–2 theoretical plates) and a glass receiver. Place 2 liters of C.P. nitric acid (containing about 5 p.p.b. arsenic and 25 p.p.b. phosphorus) in the distilling flask. Add about 5 ml. of 2.5 weight percent aqueous solution of potassium permanganate and about 5 grams of solid molybdenum trioxide. Heat the acid to boiling at atmospheric pressure for about one minute, then connect the distillation column to the flask and continue heating to boiling at atmospheric pressure until about 25 ml. of nitric acid distillate has collected in the receiver. Discard this distillate since it contains impurities picked up from the receiver walls. Allow the system to cool for one hour. Heat the nitric acid again to boiling at atmospheric pressure and when 100 ml. nitric acid distillate has been collected in the receiver, use this to rinse the receiver. Discard this rinse acid. Resume distilling and maintain product recovery at a very slow rate. Retain the next 1500 ml. of purified distillate. Discard the distillation flask residue since it contains the oxidized impurity compounds and complex compounds. This purified nitric acid product contains no detectable amounts of arsenic and prosphorus (less than 0.5 p.p.b. by weight by colorimetric techniques). Such product has utility in analytical procedures wherein trace amounts of arsenic and phosphorus would lead to erroneous results and in other applications requiring a high-purity nitric acid. This process provides nitric acid having a purity unequalled in the prior art.

The phosphorus and arsenic impurities are described herein in terms of parts by weight phosphorus or arsenic, for example. These terms refer to equivalent weight of elemental metal. The impurities are generally not present in elemental form but are present in some combined form such as arsenic and phosphorus compounds.

What is claimed is:

1. A process for removing arsenic, phosphorus and sulfur impurities from nitric acid which comprises contacting the nitric acid with an oxidizing agent and a molybdenum compound to form high-boiling point oxidized impurity compounds and complex compounds, and separating the high-boiling point oxidized impurity compounds and complex compounds from the nitric acid.

2. A process for removing arsenic, phosphorus and sulfur impurities from nitric acid which comprises contacting the nitric acid with an oxidizing agent and a molybdenum compound to form high-boiling point oxidized impurity compounds and complex compounds, and separating the high-boiling point oxidized impurity compounds and complex compounds from the nitric acid by distillation.

3. A process for removing arsenic, phosphorus and sulfur impurities from nitric acid which comprises contacting the nitric acid with an oxidizing agent, a molybdenum compound and a barium compound to form high-boiling point oxidized impurity compounds and complex compounds, and separating the high-boiling point oxidized impurity compounds and complex compounds from the nitric acid by distillation.

4. A process for removing arsenic impurities from nitric acid which comprises contacting the nitric acid with an oxidizing agent selected from the class consisting of alkali metal permanganates and alkaline earth metal permanganates to form high boiling point oxidized impurity compounds and separating the high boiling point oxidized impurity compounds from the nitric acid by distillation.

5. A process for removing impurities from nitric acid as claimed in claim 2 wherein the oxidizing agent is selected from the class consisting of alkali metal permanganates and alkaline earth metal permanganates.

6. A process for removing impurities from nitric acid as claimed in claim 2 wherein the oxidizing agent is potassium permanganate.

7. A process for removing arsenic, phosphorus and sulfur impurities as claimed in claim 1 wherein the oxidizing agent is potassium permanganate and the molybdenum compound is molybdenum trioxide.

8. A process for removing arsenic, phosphorus and sulfur impurities from nitric acid as claimed in claim 3 wherein the oxidizing agent is potassium permanganate, the molybdenum compound is molybdenum trioxide and the barium compound is barium oxide.

References Cited by the Examiner
UNITED STATES PATENTS
1,315,354   9/19   Warner _____ 23—159

OTHER REFERENCES

Krametz et al.: Article in Industrial and Engineering Chemistry, vol. 51, February 1959, page 229.

Stern et al.: Article in Chemical Reviews, April 1960, pages 185–207.

MAURICE A. BRINDISI, *Primary Examiner.*

BENJAMIN HENKIN, *Examiner.*